United States Patent [19]

Ashi et al.

[11] Patent Number: 5,018,135
[45] Date of Patent: May 21, 1991

[54] ADD DROP MULTIPLEXER

[75] Inventors: Yoshihiro Ashi; Tadayuki Kanno, both of Yokohama, Japan

[73] Assignee: Hitachi, Ltd., Tokyo, Japan

[21] Appl. No.: 412,475

[22] Filed: Sep. 26, 1989

[30] Foreign Application Priority Data

Sep. 28, 1988 [JP] Japan .................................. 63-241042

[51] Int. Cl.[5] ............................................... H04J 3/08
[52] U.S. Cl. ..................................... 370/55; 370/85.12
[58] Field of Search ..................... 370/55, 85.12, 85.15, 370/97, 105.1, 108

[56] References Cited

U.S. PATENT DOCUMENTS

| 4,569,041 | 2/1986 | Takeuchi et al. | 370/85.12 |
| 4,797,882 | 1/1989 | Maxemchuk | 370/85.12 |
| 4,860,282 | 8/1989 | Itoh et al. | 370/55 |
| 4,860,284 | 8/1989 | Brown et al. | 370/85.12 |

OTHER PUBLICATIONS

Wakabayashi et al., "A Synchronous D.53 Add/Drop Multiplexer with Cross-Connect", I.E.E.E. Global Telecommunications Conference, Dec. 1-4, 1986, pp. 1195-1199.

Primary Examiner—Douglas W. Olms
Assistant Examiner—Melvin Marcelo
Attorney, Agent, or Firm—Antonelli, Terry, Stout & Kraus

[57] ABSTRACT

The present invention relates to an add drop multiplexer related to the synchronous multiplexing method, and includes a pass-through line connecting unit, which is driven by a timing signal extracted from a signal received through a transmission line and effects branching and insertion of the line as well as connection of pass-through lines at multiplexed levels; an office line connecting unit having an office interface function for each of other devices in a same office; a first frame aligner connecting multiplex branched signals from the pass-through line connecting unit with the office line connecting unit; and a second frame aligner connecting multiplex inserted signals from the office line connecting unit with the pass-through line connecting unit. In this way, since the whole pass-through line connecting unit can be driven only with the timing signal extracted from the received signal from the transmission line and the frame aligner can be removed from the path of the signal through the pass-through lines, it is possible to reduce the signal delay in the pass-through lines within the add drop multiplexer.

12 Claims, 6 Drawing Sheets

ADD DROP MULTIPLEXER

BACKGROUND OF THE INVENTION

The present invention relates to an add drop multiplexer (ADM) related to a synchronous multiplexing method and in particular, to an add drop multiplexer suitable for the case where it is required that the signal delay produced in the path line be small.

A prior art add drop multiplexer is disclosed in a report published in IEEE GLOBECOM' 86, No. 33.5.1-No. 33.5.5 pp. 1195-1199. In this multiplexer, as indicated in FIG. 1, signals in a high speed highway are branched to a low speed highway and signals in the low speed highway are inserted in the high speed high way. The add drop multiplexer in the literature stated above is applied to the 3rd order group of synchronous transmission lines in North America indicated in FIG. 2. The transmission lines are classified into 3 ranks, i.e. 1st order group, 2nd order group and 3rd order group, increasingly numbered with increasing bit rate, which are multiplexed at 1.544 Mb/s, 6.312 Mb/s an 45 Mb/s, respectively.

In prior art synchronous multiplexers there are disposed frame aligners in the receiving interface section in order to absorb fluctuations in phase (wander) having a long period in the received signal, accompanied by elongation and contraction of transmission lines due to fluctuations in temperature around the transmission lines and relays, and to match the phase of the received signal with the working phase in the multiplexer. In the case described in the above literature, in order to realize the functions stated above, an elastic store memory, (ES), which is a first-in-first-out memory is disposed as the frame aligner in the receiving interface section.

The add drop multiplexer is described in "Foreign Communication Techniques", December 1985, pp. 33-34, published by NTT.

According to the prior art techniques the frame aligner is disposed on the signal transmission line in the receiving interface section to absorb the wander produced on the signal transmission line and to effect the phase matching of the received signal with the working phase in the multiplexer. Consequently, a signal delay is added at the frame aligner section, until the signal received through the transmission line is sent to the transmission line as the pass-through line signal as it is.

FIG. 3 is a scheme for explaining the construction of a ring type transmission line, conceivable as a topological construction, to which a multiplexer according to the present invention is applied.

Among the nodes connecting a ring type transmission line transmitting signals only in one direction in FIG. 3, there are nodes 200-212, from which the transmission line goes out only in two directions, and nodes 100-102, from which the transmission line goes out in three directions to connect it with another ring type transmission line. The application of the add drop multiplexer according to the present invention is contemplated for the nodes 200-212, from which the transmission line goes out in two directions in these two kinds of nodes.

In FIG. 3, A and C represent ring type transmission lines in use and B and D represent spare ring type transmission lines, which are turned-on, when the transmission lines A and C are out of order, respectively, to be used instead thereof. When a signal is transmitted from the node 200 to the node 201, it is sent in the direction indicated by an arrow through the transmission line A. On the contrary, when the signal is transmitted from the node 201 to the node 200, it is sent through the nodes 202, 203, ..., 206 and 100, making almost one turn.

In the ring type transmission line, as indicated in FIG. 3, since the signal delay due to the multiplexers installed in the nodes 200 to 212 is added to the signal propagation delay on the transmission line, even if it serves as a pass-through line, it is required to reduce the signal delay due to the multiplexer installed in each of the nodes. However, the add drop multiplexer according to the prior art techniques as described above has a problem that the signal delay due to the frame aligner inserted in series in the signal transmission line is predominant in the signal delay within the multiplexer and that it is so great that it cannot be neglected with respect to the signal propagation delay on the transmission line.

SUMMARY OF THE INVENTION

The principal object of the present invention is to provide an add drop multiplexer, in which the signal delay in a pass-through line is small, taking into account the application thereof to a loop type transmission line.

Another object of the present invention is to reduce the scale of the circuit by effecting signal processing such as line termination, etc. for each of line signals multiplexed in time sharing in the signal in multiplexed levels.

The above object can be achieved by constructing the add drop multiplexer using a pass-through line connecting unit, which is driven by a timing signal extracted from a signal received from a transmission line and which effects branching and insertion of the line as well as the connection of pass-through lines at multiplexed levels, an office line connecting unit having an office interface function for each of other devices in a same office, a frame aligner connecting multiplex branched signals from the pass-through line connecting unit with the office line connecting unit, and a frame aligner connecting multiplex inserted signals from the office line connecting unit with the pass-through line connecting unit.

The frame aligner connecting multiplex inserted signals from the office line connecting unit with the pass-through line connecting unit matches the inserted signal having an office frame phase with a transmission line frame phase within the office line connecting unit. In the same way, the frame aligner connecting multiplex branched signals from the pass-through line connecting unit with the office line connecting unit matches the branched signal having the transmission line frame phase with the office line frame phase within the office line connecting unit. In this way, since the whole pass-through line connecting unit can be driven only with the timing signal extracted from the received signal from the transmission line and the frame aligner can be removed from the path of the signal through the pass-through lines, it is possible to reduce the signal delay in the pass-through lines within the add drop multiplexer.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Figure 1:
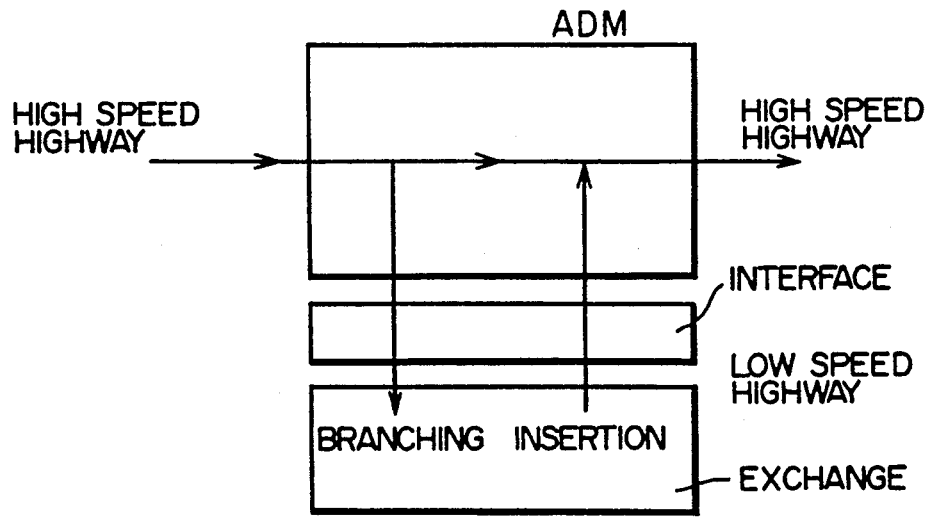
FIG. 1 indicates the basic principle of the prior art ADM.
Figure 2:
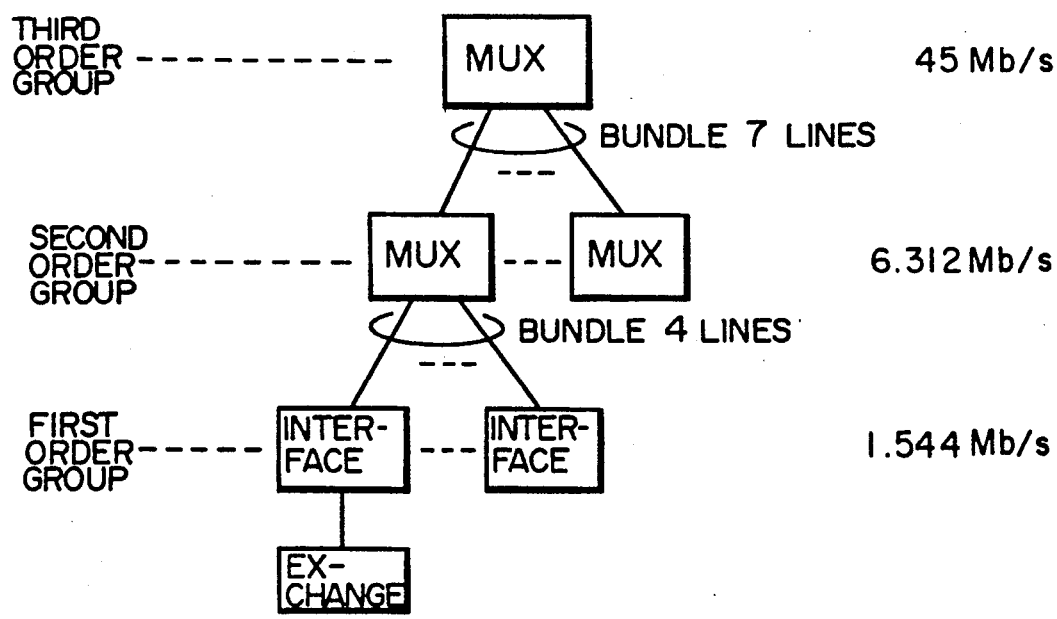
FIG. 2 is a scheme for explaining the synchonous third order group of transmission lines for explaining the present invention.
Figure 3:
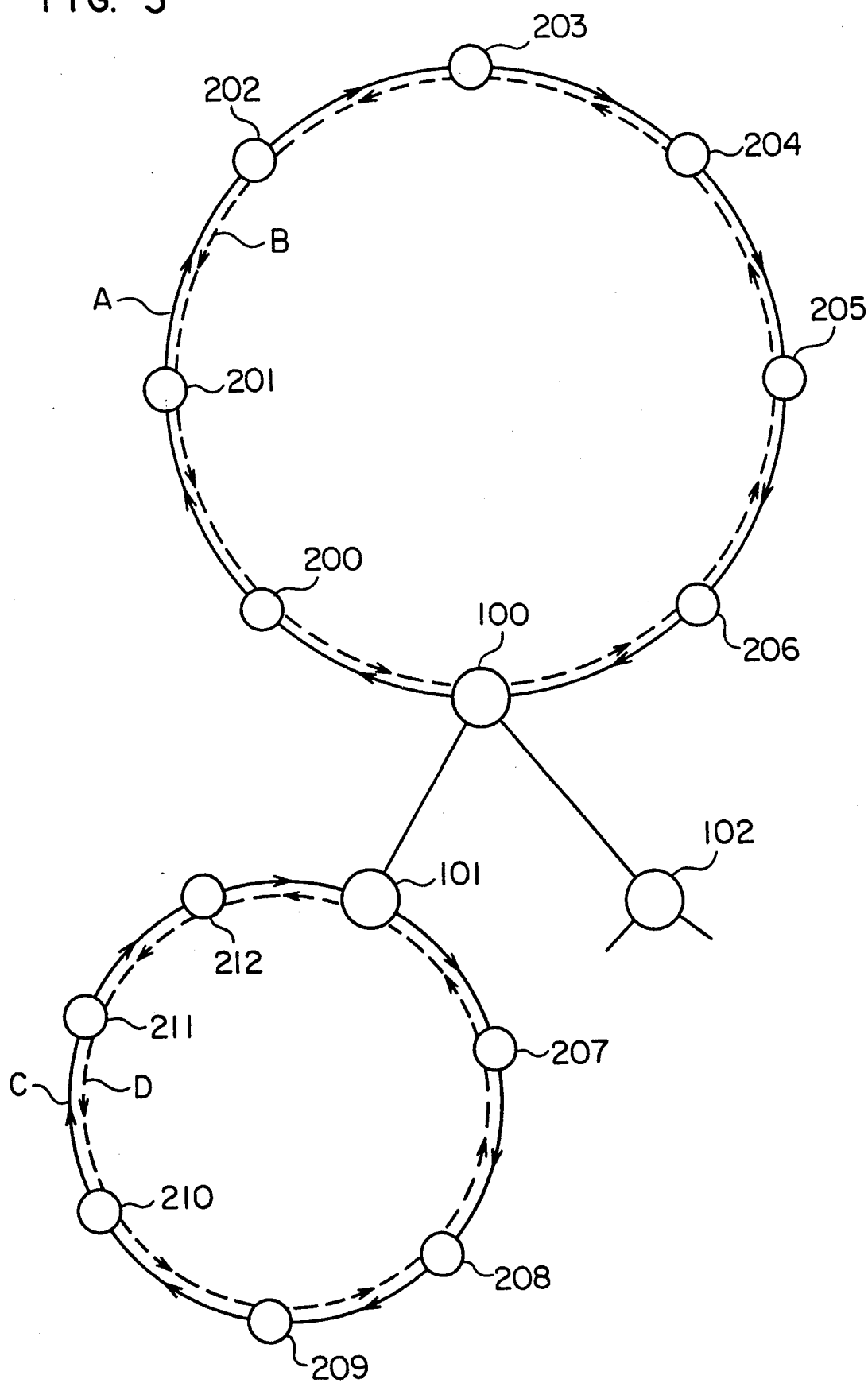
FIG. 3 is a scheme illustrating the construction of a ring type transmission line, to which the multiplexer according to the present invention is applied.

Hereinbelow an embodiment of the present invention will be explained, referring to the drawings.

Figure 4:
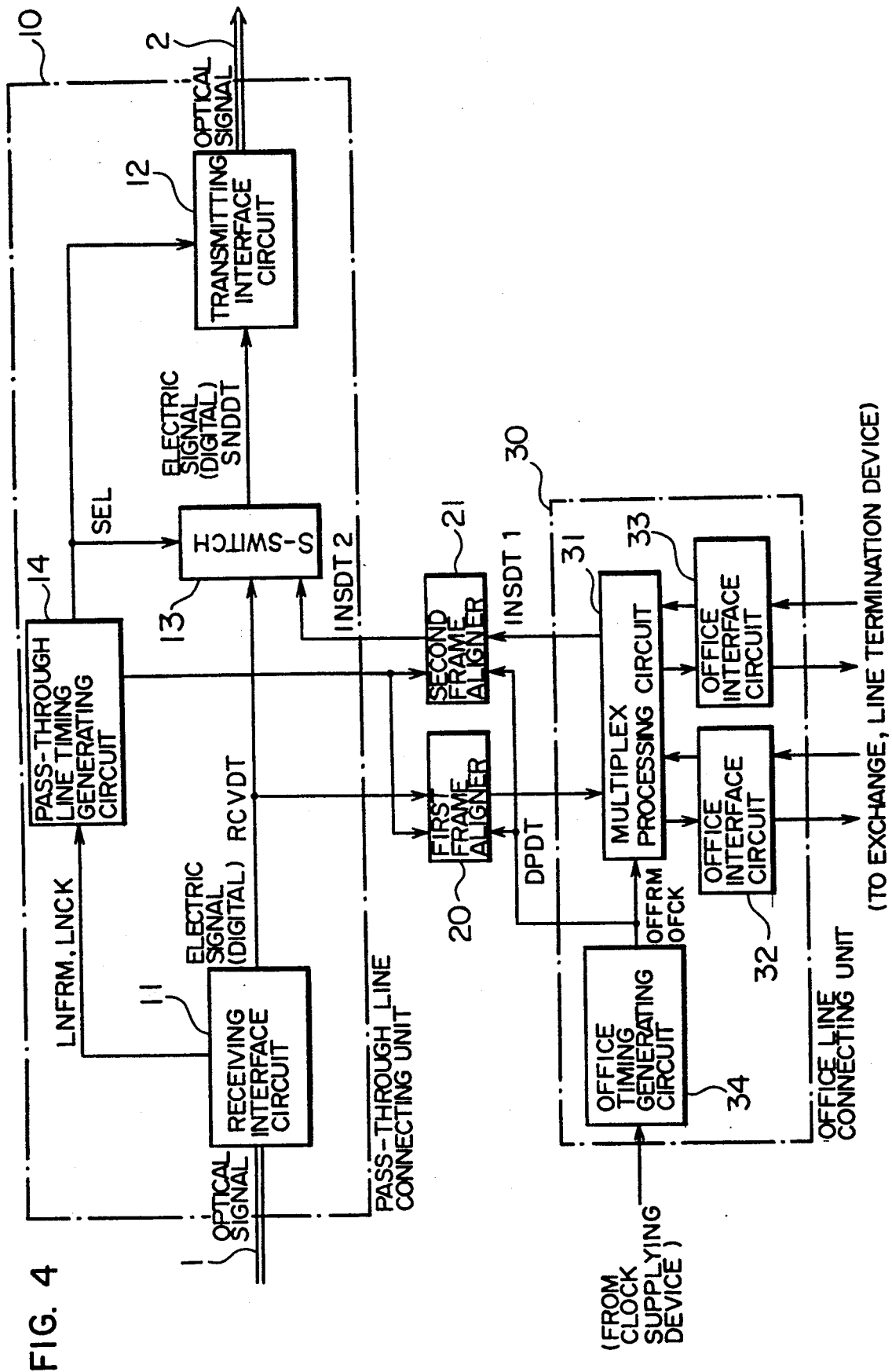
FIG. 4 is a block diagram illustrating the construction of a first embodiment of the add drop multiplexer according to the present invention.

FIG. 4 illustrates an example of the construction of the add drop multiplexer according to the present embodiment. The add drop multiplexer according to the present embodiment consists of a pass-through line connecting section 10, a first and a second frame aligner 20 and 21, and an office line connecting section 30. Among them the pass-through line connecting section consists of a receiving interface circuit 11, a time sharing type spatial switch (hereinbelow called S-switch) 13, a transmitting interface circuit 12 and a pass-through line timing generating circuit 14. On the other hand, the office line connecting section 30 consists of a multiplex processing circuit 31, office interface circuits 32 and 33, and an office timing generating circuit 34.

Next, connections between different circuit blocks will be explained. At first, for the pass-through line connecting section 10, an optical transmission line 1 is connected with the receiving interface circuit 11 so that an optical signal is inputted in the receiving interface circuit 11. The receiving interface circuit 11 performs the frame synchronization after having effected optoelectric transformation, decoding and clock extraction, and transmits an extracted clock LNCK (LINE CLOCK) and a transmission line frame phase signal LNFRM (LINE FRAME) to the pass-through line timing generating circuit 14. Receiving interface circuit 11 transmits further a receive data signal RCVDT (RECEIVE DATA) to the S-switch 13 and the frame aligner 20. Furthermore, the S-switch 13 receives an insertion office line signal INSDT 2 (INSERT DATA 2) from the second frame aligner 21 and after having selected one of them, the S-switch 13 transmits it to the transmitting interface circuit 12 as a transmission data signal SNDDT (SEND DATA). The transmitting interface circuit 12 performs addition of alarm information, coding and electro-optic transformation and transmits an optical signal to the optical transmission line 2. The pass-through line timing generating circuit 14 generates a timing signal necessary for dividing the pass-through line connecting section 10, the first and the second frame aligners 20 and 21, based on the extracted clock LNCK (LINE CLOCK) received from the receiving interface circuit 11 and the transmission line frame phase signal LNFRM (LINE FRAME) indicating the heading of the multiplex data and transmits it, distributing it to the S-switch 13, the transmitting interface circuit 1, the first and the second frame aligners 20 and 21.

Now, connections between different circuit blocks within the office line connecting section 30 will be described. At first, the office interface circuits 32 and 33 are connected with a switchboard, line terminal devices, etc. within an office building through cables to receive and transmit signals. The office interface circuits 32 and 33 perform the frame synchronization after having effected code transformation, and exchange data signals with the multiplex processing circuit 31. The multiplex procesing circuit 31 multiplexes the data signals received from the office interface circuits 32 and 33. It transmits an insertion office line signal INSDT 1 (INSERT DATA 1) working with the office timing to the input of the second frame aligner 21 and at the same time demultiplexes a drop office line signal DPDT (DROP DATA) from the first frame aligner 20 to transmit it to the office interface circuits 32 and 33. The office timing generating circuit 34 receives a reference timing signal synchronized in frequency between different office buildings by the network synchronizing techniques from a clock supplying device installed in an office building, and distributes an office frame phase signal OFFRM (OFFICE FRAME) and the office clock OFCK (OFFICE CLOCK) necessary for driving the office line connecting section 30, the first and the second frame aligners 20 and 21 to the multiplex processing circuit 31, the office interface circuits 32 and 33, the first and the second frame aligners 20 and 21.

Next, the operation of the first embodiment of the present invention will be explained, with stress on the line branching and inserting operation, which is the central point of the present invention.

Figure 5:
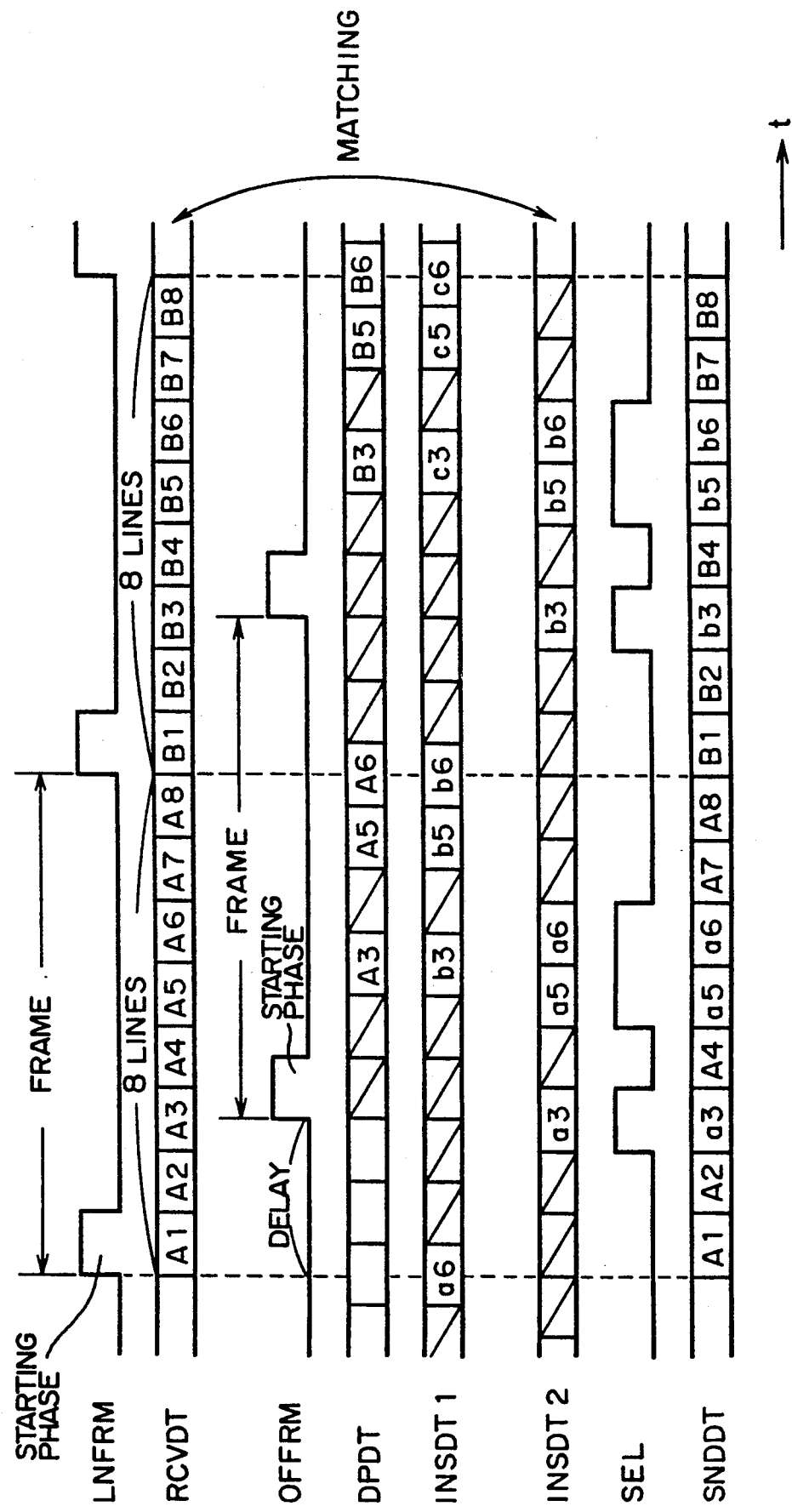
FIG. 5 shows the timing of various input and output signals relating to branching and inserting operations from/in the transmission line indicated in FIG. 4.

FIG. 5 indicates the timing of the in-and output signals of the S-switch 13, the first and the second frame aligners 20 and 21 relating to the line branching and inserting operation indicated in FIG. 4. Here the transmission line frame phase signal LNFRM (LINE FRAME) specifies the starting phase of the frame of the receive data RCVDT (RECEIVE DATA) of 8 lines from the transmission line. In the same way, the office frame phase OFFRM (OFFICE FRAME) indicates the starting phase of the frames of the drop office line signal DRDT (DROP DATA) transmitted from the first frame aligner 20 to the multiplex processing circuit 31 in the office line connecting section 30 and the insertion office line signal INSDT 1 (INSERT DATA 1) transmitted inversely from the multiplex processing circuit 31 to the second frame aligner 21. As indicated by the phase relation between the LNFRM (LINE FRAME) and the OFFRM (OFFICE FRAME) in FIG. 5, also in the case where the clock signals are synchronized in frequency between different office buildings by the network synchronizing techniques, the frame phases of the two are, in general, not in accordance with each other because of the signal delay produced in the transmission line. Consequently, in order to branch a line signal from the received signal RCVDT (RECEIVE DATA) from the transmission line to the office line connecting section 30 side, or to insert inversely the line signal from the office line connecting section 30 to transmit it to the transmission line, matched with the office phase, the frame phase of the line signal should be matched therewith. It is the first and the second frame aligners 20 and 21 that perform this frame phase matching.

The first frame aligner 20 branches the line signal from the received data RCVDT synchronized with the transmission line frame phase LNFRM; absorbs fluctuations in the phase, or wander, in the transmission line; performs the frame phase matching; and transmits it as the drop office line signal DPDT synchronized with the office frame phase OFFRM. In the same way, the second frame aligner 21 receives the insertion office line signal INSDT 1 synchronized with the OFFRM; performs the frame phase matching; and transmits it as the insertion office line signal INSDT 2 synchronized with the transmission line frame phase LNFRM including the wander on the transmission line. At this time, the operation of the signal input side of the first frame aligner 20 and the signal output side of the second frame aligner 21 is controlled by the timing signal from the pass-through line timing generating circuit 14. Further, the operation of the signal input side of the second frame aligner 21 and the signal output side of the first frame aligner 21 is controlled by the timing signal from the office timing generating circuit 34.

As described above, by disposing the first and the second aligners 20 and 21 between the pass-through line connecting section 10 and the office line connecting section 30, as indicated in FIG. 5, at the input of the S-switch 13 in the pass-through line connecting section 10, the frame phases of the receive data signal RCVDT from the transmission line and the insertion office line signal INSDT 2 are matched with each other. Consequently, at the S-switch 13, by the 1 out of 2 selection 2 to 1 (two input-1 output) operation by a selection control signal SEL within the S-switch, from the RCVDT a pass-through line (connected line) signal and from the INSDT 2 an insertion line signal from the office (drop line) are selected in time sharing. In this way, it is possible to transmit such signals to the transmission line 2 through the transmitting interface circuit 12. Among the transmission data signals SNDDT in FIG. 5, alphabetical majuscule letters indicate pass-through line signals and alphabetical minuscule letters drop line signals (signals raised from the exchange to the transmission line). Among them the pass-through line signal is never delayed with respect to the receive data signal RCVDT, as understood from the FIG. 5. Further, by disposing the first and the second frame aligners 20 and 21 between the pass-through line connecting section 10 and the office line connecting section 30, it is not necessary to dispose any frame aligner in the receiving interface circuit 11 for matching it with the office frame phase and it is possible to reduce remarkably the signal delay in the pass-through line. The parts indicated by oblique lines for the DPDT, the INSDT 1 and the INSDT 2 show dummies in which no signals are contained.

Figure 6:
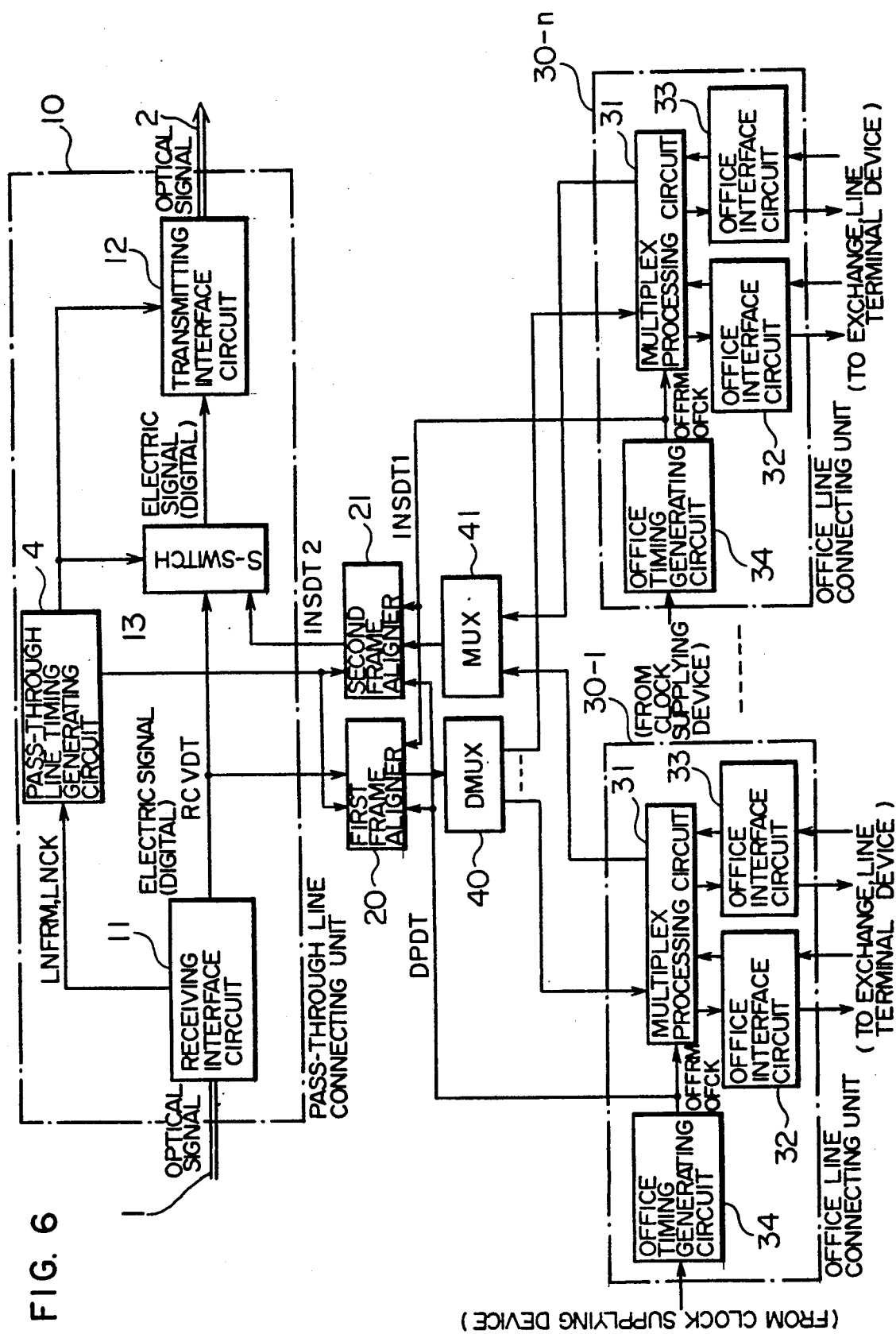
FIG. 6 is a block diagram illustrating the construction of a second embodiment of the add drop multiplexer according to the present invention.

FIG. 6 is a scheme illustrating the circuit construction of a second embodiment of the add drop multiplexer according to the present invention, in which a pair of frame aligners (20, 21) and n office line connecting units (30-1, 30-2, ..., 30-n) are disposed for one pass-through line connecting unit (10). A demultiplexer DMUX (40) and a multiplexer MUX (41) are connected between the pair of frame aligners (20, 21) and the n office line connecting units (30-1, 30-2, ..., 30-n). In this way either of the n office line connecting units can be connected with the pass-through line connecting section (10).

Figure 7:
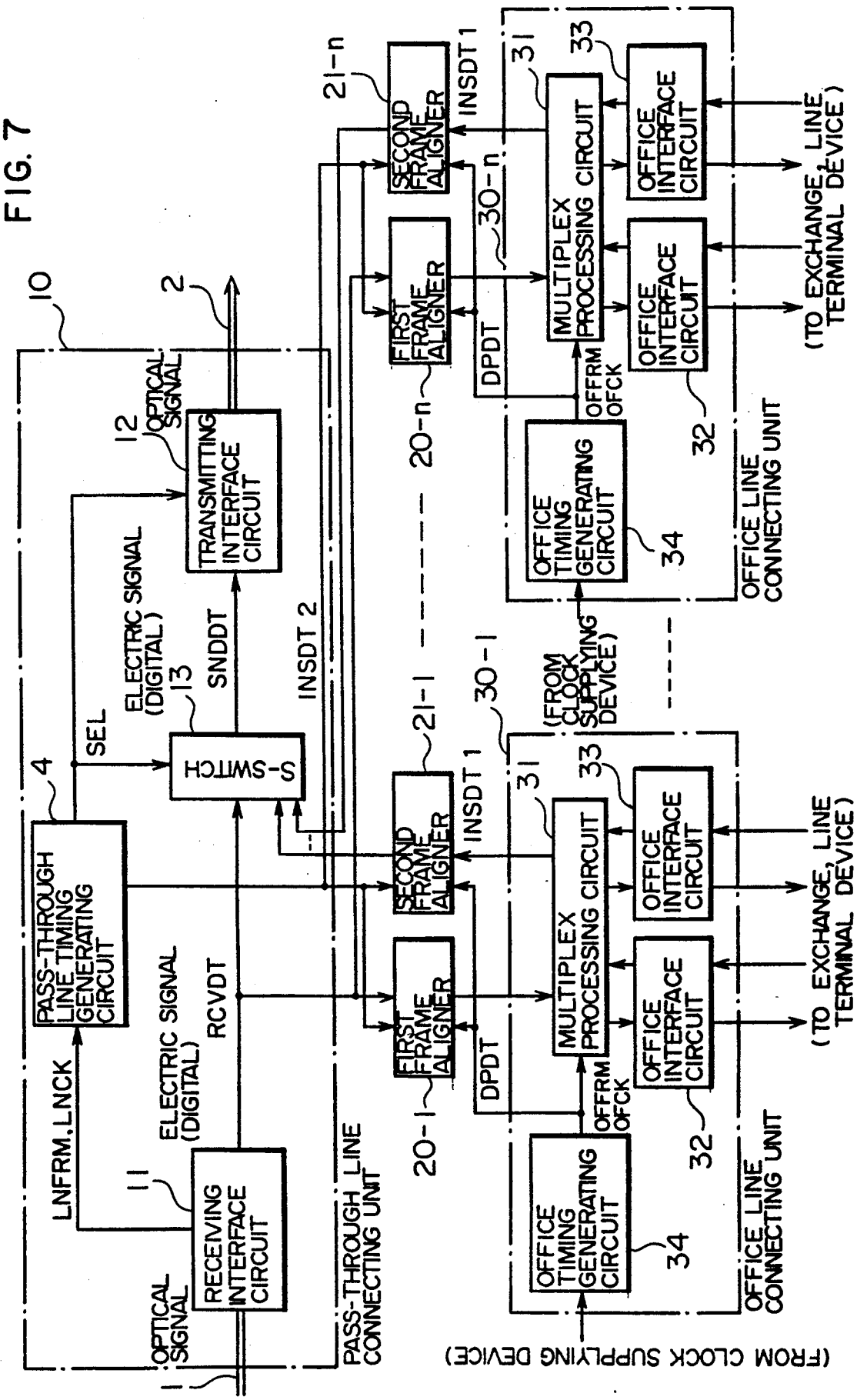
FIG. 7 is a block diagram illustrating the construction of a third embodiment of the add drop multiplexer according to the present invention.

FIG. 7 is a scheme illustrating the circuit construction of a third embodiment of the add drop multiplexer according to the present invention, in which n pairs of frame aligners (20-1, 21-1, ..., 20-n, 21-n) and n office line connecting units (30-1, 30-2, ..., 30-n) are disposed for one pass-through line connecting unit (10) and either one of the n office line connecting units is selected by the S-switch (13).

As described above, by using the add drop multiplexer according to the present invention, there exist only signal delays due to the code transformation and the flipflops for the timing and the amount of the delay is an order of several bits to several tens of bits in a usual multiplexer design. Therefore, it is possible to intend to reduce remarkably the signal delay with respect to that obtained by the prior art technique, by which the frame aligner is disposed in the receiving interface circuit.

Further, as indicated by the phase relation between the drop office line signal DPDT and the insertion office line signal INSDT 1 in FIG. 5, in the multiplex processing circuit 31 the phases of the signals transmitted and received to/from the pass-through line connecting section side are matched with each other. For this reason, it is possible to realize signal processing such as line termination, etc. for each of line signals multiplexed in time sharing in the signal at multiplexed levels and to realize to reduce the scale of the circuit.

According to the present invention, since it is possible to suppress the signal delay produced in the pass-through line within the multiplexer to the delay necessary for the passing through gate circuits and signal speed transformation, an excellent effect can be obtained so that the quality of the transmission is improved from the point of view of decreasing the signal delay with respect to that obtained by the add drop multiplexer according to the prior art techniques.

We claim:

1. An add drop multiplexer, in which digital transmission lines synchronized in a circuit network are installed, comprising:
    a pass-through line connecting unit which is driven by a timing signal extracted from a transmission line signal that has passed through a transmission line and effects branching and insertion of the transmission line as well as connection of pass-through lines at multiplexed levels;
    an office line connecting unit which performs an office interface function for each of a plurality of devices in a single office;
    a first frame aligner connecting multiplex branched signals from said pass-through line connecting unit with said office line connecting unit; and
    a second frame aligner connecting multiplex inserted signals from said office line connecting unit with said pass-through line connecting unit.

2. An add drop multiplexer, in which digital transmission lines synchronized in a circuit network are installed, comprising:
    a pass-through line connecting unit which is driven by a timing signal extracted from a transmission line signal that has passed through a transmission line and effects branching of a specified line among received signals in the transmission line towards an office side of the add drop multiplexer and insertion of a specified line on the office side into transmitted signals in the transmission line as well as connection of pass-through lines at multiplexed levels;

a plurality of office line connecting units, each of which performs an office interface function for each of a plurality of devices in a single office;

a first frame aligner connecting multiplex branched signals from said pass-through line connecting unit with one of said plurality of office line connecting units through a demultiplexing circuit; and a second frame aligner connecting multiplex inserted signals from one of said plurality of office line connecting units with said pass-through line connecting unit through a multiplexing circuit.

3. An add drop multiplexer, in which digital transmission lines synchronized in a circuit network are installed, comprising:

a pass-through line connecting unit which is driven by a timing signal extracted from a transmission line signal that has passed through a transmission line and effects branching of a specified line among received signals in the transmission line towards an office side of the add drop multiplexer and insertion of a specified line on the office side into transmitted signals in the transmission line as well as connection of pass-through lines at multiplexed levels, said pass-through line connecting unit including a time sharing type spatial switch;

a plurality of office line connecting units, each of which performs an office interface function for each of a plurality of devices in a single office;

a plurality of first frame aligners respectively connecting multiplex branched signals from said pass-through line connecting unit with corresponding ones of said plurality of office line connecting units through at least one demultiplexing circuit, the number of said first frame aligners being equal to the number of said plurality of office line connecting units; and a plurality of second frame aligners respectively connecting multiplex inserted signals from corresponding ones of said plurality of office line connecting units with said pass-through line connecting unit through at least one multiplexing circuit, the number of said second frame aligners being equal to the number of said plurality of office line connecting units;

wherein said spatial switch selects one of said plurality of office line connecting units.

4. An add drop multiplexer according to claim 1, wherein said first frame aligner is connected to receive a data signal from said pass-through line connecting unit and a first phase signal from said office line connecting unit and outputs a version of said data signal which is synchronized with said first phase signal to said office line connecting unit, and said second frame aligner is connected to receive an insertion office line signal from said office line connecting unit and a second phase signal from said pass-through line connecting unit and outputs a version of said insertion office line signal which is synchronized with said second phase signal to said pass-through line connecting unit.

5. An add drop multiplexer according to claim 1, wherein:

said pass-through line connecting unit includes a receiving interface circuit connected to receive the transmission line signal, a data insertion circuit coupled to said receiving interface circuit for inserting data into the transmission line signal, and a transmitting interface circuit connected to receive the transmission line signal into which the data has been inserted and to output a signal corresponding to the signal it is connected to receive; and said data insertion circuit is connected to receive the transmission line signal frame said receiving interface circuit, and the transmission line signal is applied to said data insertion circuit from said receiving interface circuit without being delayed.

6. An add drop multiplexer according to claim 5, wherein the data inserted into the transmission line signal is applied to said data insertion circuit from said office line connecting unit.

7. An add drop multiplexer according to claim 2, wherein said first frame aligner is connected to receive a data signal from said pass-through line connecting unit and a first phase signal from one of said office line connecting units and output a version of said data signal which is synchronized with said first phase signal to one of said office line connecting units, and said second frame aligner is connected to receive an insertion office line signal from one of said office line connecting units and a second phase signal from said pass-through line connecting unit and output a version of said insertion office line signal which is synchronized with said second phase signal to said pass-through connecting line unit.

8. An add drop multiplexer according to claim 2, wherein:

said pass-through line connecting unit includes a receiving interface circuit connected to receive the transmission line signal, a data insertion circuit coupled to said receiving interface circuit for inserting data into the transmission line signal, and a transmitting interface circuit connected to receive the transmission line signal into which the data has been inserted and to output a signal corresponding to the signal it is connected to receive; and said data insertion circuit is connected to receive the transmission line signal from said receiving interface circuit, and the transmission line signal is applied to said data interface circuit from said receiving interface circuit without being delayed.

9. An add drop multiplexer according to claim 8, wherein the data inserted into the transmission line signal is applied to said data interface circuit from one of said office line connecting units.

10. An add drop multiplexer according to claim 3, wherein said first frame aligners are connected to receive a data signal from said pass-through line connecting unit and a first phase signal from one of said office line connecting units and output a version of said data signal which is synchronized with said first phase signal to one of said office line connecting units, and said second frame aligners are connected to receive an insertion office line signal from one of said office line connecting units and a second phase signal from said pass-through line connecting unit and output a version of said insertion office line signal which is synchronized with said second phase signal to said pass-through connecting line unit.

11. An add drop multiplexer according to claim 3, wherein:

said pass-through line connecting unit includes a receiving interface circuit connected to receive the transmission line signal, a data insertion circuit coupled to said receiving interface circuit for inserting data into the transmission line signal, and a transmitting interface circuit connected to receive the transmission line signal into which the data has been inserted and to output a signal corresponding to the signal it is connected to receive; and said data insertion circuit is connected to receive the transmission line signal from said receiving interface circuit, and the transmission line signal is applied to said data interface circuit from said receiving interface circuit without being delayed.

12. An add drop multiplexer according to claim 11, wherein the data inserted into the transmission line signal is applied to said data interface circuit from one of said office line connecting units.

* * * * *